Patented Feb. 18, 1936

2,030,876

UNITED STATES PATENT OFFICE 2,030,876

COMPOUNDS OF THE N-DIHYDRO-1,2,2',1'-ANTHRAQUINONE AZINE SERIES AND PROCESS FOR THE PRODUCTION THEREOF

Frank Willard Johnson, Pennsgrove, N. J., assignor to E. I. du Pont de Nemours & Company, Wilmington, Del., a corporation of Delaware No Drawing. Application July 27, 1932, Serial No. 625,213

13 Claims. (Cl. 260—31)

This invenion relates to carbon compounds, more particularly anthraquinone derivatives, and processes for the production thereof.

It is known that certain anthraquinone derivatives may be condensed to produce compounds of higher molecular weight, many of which are valuable dyes. Thus, various methods have been proposed for the production of N-dihydro-1,2,2',1'-anthraquinone azine, for example, by the condensation of 2-amino-anthraquinone in a caustic alkali fusion. This procedure is attended by certain commercial disadvantages inherent in the use of concentrated caustic alkali.

It is an object of the present invention to provide a new and improved process for producing anthraquinone condensation products. A further object is to produce N-dihydro-1,2,2',1'-anthraquinone azine and derivatives thereof by a direct method using raw materials which have never been successfully employed for this purpose. A still further object is the production of chlorine derivatives of N-dihydro-1,2,2',1'-anthraquinone azine. Another object is the production of chlorine derivatives of N-dihydro-1,2,2',1'-anthraquinone azine by a method which is easily controlled to produce products containing any desired amount of chlorine within the range of about 0–13.9%. Other objects will appear hereinafter.

These objects are accomplished according to this invention by condensing 2-amino-1-chloroanthraquinone or a derivative thereof, in the presence of cuprous iodide, preferably by heating the 2-amino-1-chloro-anthraquinone (or derivative) in a suitable liquid reaction medium together with the cuprous iodide and an acid-binding agent, e. g. sodium acetate. In practicing the invention, the reaction mixture should preferably be stirred or agitated. The product may be isolated in any suitable manner, for example, by filtering and washing out the solvent or suspension medium, acid binder and catalyst with solvents or by steam distilling off the solvent after which the product may be separated by filtration and washed with water.

While the invention is susceptible of considerable variation and modification in the manner of its practical application, particularly as regards the character of the 2-amino-1-chloro-anthraquinone derivatives employed, the catalyst, acid-binding agents, solvent or suspension medium, temperatures, proportions of materials, and exact manner of procedure, the following examples will illustrate how the invention may be practiced. The proportions are given in parts by weight.

Example I

Ten (10) parts of 2-amino-1-chloroanthraquinone, 8.0 parts of anhydrous sodium acetate, 0.75 part of cuprous iodide and 100 parts of naphthalene are agitated together at 175° C. with or without exclusion of air, until no further formation of dye takes place. The melt is diluted with solvent naphtha and filtered. After washing out the naphthalene with solvent naphtha the latter is removed with alcohol and the product finally washed with water. The dye is obtained in beautiful bronzy blue crystals in an excellent state of purity.

Example II

Ten (10) parts of 2-amino-1,3-dichloranthraquinone, 7.0 parts of anhydrous sodium acetate, 0.5 part of cuprous iodide and 100 parts of naphthalene are heated together at about 185° C. with good agitation until no more dye is formed and the resultant solid product is recovered as described in Example I. It is a blue dye yielding dyeings of excellent fastness to light, soap, boiling and chlorine and having most probably the following structural formula:

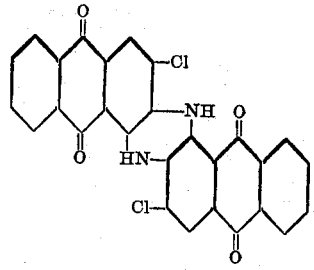

Example III

Five (5) parts of 2-amino-1-chloranthraquinone, 5 parts of 2-amino-1,3-dichloranthraqinone, 8 parts of dry sodium acetate, 0.75 part of cuprous iodide and 100 parts of naphthalene are agitated together at 175° C. until no more dye is formed. The naphthalene is then removed by steam distillation and the dye is filtered from the suspension, washed and dried. It is a blue dye containing about 7.5% by weight of chlorine and yielding dyeings and printings of excellent qualities.

The preparation of the 2-amino-1-chloranthraquinone derivatives employed as intermediates in accordance with the present invention is described in the literature and patents. Thus, 2-amino-1-chloranthraquinone may be obtained by chlorinating 2-amino-anthraquinone, at low temperatures, according to the method described in British Patent 173,166. To obtain the dichloranthraquinone the 2-amino-1-chloranthraquinone may be further chlorinated or the methods described by Junghaus (Ann. 399, 316) (1913) may be used or 2-amino-anthraquinone may be chlorinated by means of sulfuryl chloride in benzene suspension. The crude intermediates may be used as such in the condensation, but a better yield and purer product is obtained if they are purified by crystallization from an organic solvent or by dilution of a sulfuric acid solution of the intermediate to a suitable concentration, say 80%, filtering, washing with dilute sulfuric acid and finally boiling up with water. If desired, the chlorination of the 2-amino-anthraquinone and the subsequent condensation may be carried out in one medium, without isolation of the intermediate.

The invention is generally applicable to the condensation of 2-amino-1-chloro-anthraquinones. As examples of such compounds may be mentioned:

2-amino-1-chloro-anthraquinone, 2-amino-1-chloro-3-anthraquinone carboxylic acid, 2-amino-1,6-dichloro-anthraquinone, 2-amino-1,7-dichloro-anthraquinone, 2-amino-1,3,6-trichloro-anthraquinone, 2-amino-1-chloro-3-methyl-anthraquinone, 2-amino-1-chloro-3-ethyl-anthraquinone, 2-amino-1,3-dichloro-6-methyl-anthraquinone, 2-amino-1,3-dichloro-6-nitro-anthraquinone, 2-amino-1-chloro-3-brom-anthraquinone, 2-amino-1-chloro-3-benzoyl-anthraquinone, 2-amino-1-chloro-3-benzoylamino-anthraquinone, 2-amino-1-chloro-3-ethoxy-anthraquinone, 2-amino-1-chloro-3-anthraquinone sulfonic acid, 2-amino-1-chloro-4-methyl-anthraquinone, 2-amino-1-chloro-4-ethyl-anthraquinone, 2-amino-1-chloro-4-phenyl-anthraquinone, 2-amino-1-chloro-4-benzyl-anthraquinone, 2-amino-1-chloro-6-methoxy-anthraquinone, and the like.

The process is especially advantageous in its application to the condensation of mixtures of 2-amino-1-chloro-anthraquinone and 2-amino-1,3-dichloro-anthraquinone obtained by any suitable method, for instance by mixing the components together or by chlorinating 2-amino-anthraquinone so that it contains more than about 13.8% by weight of chlorine but less than about 24.2% chlorine. The resultant product may contain any desired amount of chlorine less than about 13.9%. These products are characterized by excellent fastness to light, soap and boiling water and are particularly valuable for textile printing.

The temperature employed in the condensation may vary within relatively wide limits depending largely upon the nature of the intermediate but should preferably be above about 150° C. and below the temperature giving rise to decomposition of the reactants and products. Generally speaking, it is desirable to employ temperatures within the range of about 165-190° C. and especially desirable results have been obtained when the temperature employed was about 175-185° C.

The nature and proportions of the acid-binding agent and solvent or suspending medium employed in the condensation are also subject to considerable variation. As acid-binding agents sodium acetate and/or sodium carbonate are preferably employed, the proportions thereof being preferably in excess of the amount required to neutralize the acid set free by the condensation reaction. As examples of high boiling solvents or suspending media naphthalene, nitrobenzene, chlorobenzenes and nitro-toluenes may be mentioned.

It will be understood that other acid-binding agents such as sodium bicarbonate, alkaline earth hydroxides, etc., may be used and other solvents or suspension media which are liquids at the reaction temperature and which are inert or do not affect the reaction unfavorably are suitable reaction media. It will be further recognized that certain additions may be made to the melt for specific purposes, such as compounds having a reducing action (e. g. hydrogenated naphthalene, sodium phenolate, etc.) to reduce the amount of oxidation.

Instead of introducing cuprous iodide into the reaction mixture as such, mixtures of salts such as may be expected under the conditions of the condensation to react, at least in part, to give cuprous iodide may be employed. Such mixtures are for example, copper acetate and/or copper carbonate with sodium iodide, potassium iodide, calcium iodide and/or barium iodide.

The advantages of the invention will be apparent. Insofar as is known, it has not heretofore been possible to produce anthraquinone derivatives of the character herein described by the condensation of 2-amino-1-chloro-anthraquinones. Furthermore, the processes previously known are not amenable to the direct formation of chlorine derivatives of N-dihydro-1,2,2',1'-anthraquinone azine containing less than 13.9% by weight of chlorine. These products, particularly those containing about 7-8% chlorine, are very valuable for both printing and dyeing.

As many apparent and widely different embodiments of this invention may be made without departing from the spirit thereof, it is to be understood that I do not limit myself to the foregoing examples or description except as indicated in the following claims.

I claim:

1. In a process of preparing condensation products of the anthraquinone series, the step which comprises condensing a 2-amino-1-chloro-anthraquinone in the presence of cuprous iodide.

2. In a process of preparing condensation products of the anthraquinone series, the step which comprises heating a 2-amino-1-chloro-anthraquinone in the presence of cuprous iodide, an acid binding agent, and an inert liquid reaction medium.

3. The process of preparing condensation products of the anthraquinone series which comprises heating a 2-amino-1-chloro-anthraquinone at a temperature above about 150° C. in the presence of cuprous iodide, an acid binding agent, and an inert liquid reaction medium.

4. The process of producing N-dihydro-1,2,2',1'-anthraquinone azine which comprises condensing 2-amino-1-chloro-anthraquinone in the presence of cuprous iodide.

5. The process of producing N-dihydro-1,2,2',1'-anthraquinone azine which comprises heating 2-amino-1-chloro-anthraquinone to a temperature of about 175-185° C. in the presence of cuprous iodide, substantially dry sodium acetate and an inert liquid reaction medium.

6. The process which comprises agitating 2-amino-1-chloro-anthraquinone in naphthalene at a temperature of about 175-185° C. and in the presence of cuprous iodide and anhydrous sodium acetate.

7. In a process of preparing condensation products of the anthraquinone series, the step which comprises condensing a 2-amino-1-chloroanthraquinone in the presence of a copper salt and an iodine salt capable of reacting at least in part to form cuprous iodide.

8. A process of preparing chloro-N-dihydro-1,2,2',1'-anthraquinone azines which comprises condensing a chlorinated 2-amino-anthraquinone having a chlorine content within the range of about 13.8–24.2% by weight, in the presence of cuprous iodide.

9. The process of producing chloro-N-dihydro-1,2,2',1'-anthraquinone azine suitable for both dyeing and printing, which comprises heating a mixture of about equal parts of 2-amino-1-chloro-anthraquinone and 2-amino-1,3-dichloro-anthraquinone to a temperature of about 175°–185° C. in an inert organic solvent medium, in the presence of cuprous iodide and at least sufficient substantially dry sodium acetate to neutralize the liberated hydrogen chloride.

10. A process of preparing halogen-N-hydro-1,2,2',1'-anthraquinone azines which comprises heating 2-amino-1-chloro-3-halogen-anthraquinone in the presence of cuprous iodide, an acid binding agent and an inert liquid reaction medium.

11. A process of preparing chloro-N-dihydro-1,2,2',1'-anthraquinone azines which comprises heating 2-amino-1,3-dichloro-anthraquinone in the presence of cuprous iodide, an acid binding agent and an inert liquid reaction medium.

12. In a process of preparing condensation products of the anthraquinone series, the step which comprises heating a 2-amino-1-chloro-anthraquinone in the presence of an acid binding agent, an inert liquid reaction medium, and a copper salt and an iodine salt capable of reacting at least in part to form cuprous iodide.

13. In a process of producing N-dihydro-1,2,2',1'-anthraquinone azine, the step which comprises condensing together two molecules of 2-amino-1-chloro-anthraquinone.

FRANK WILLARD JOHNSON.